W. GEIST.
GLARE PROTECTOR.
APPLICATION FILED OCT. 20, 1916.
1,258,107. Patented Mar. 5, 1918.
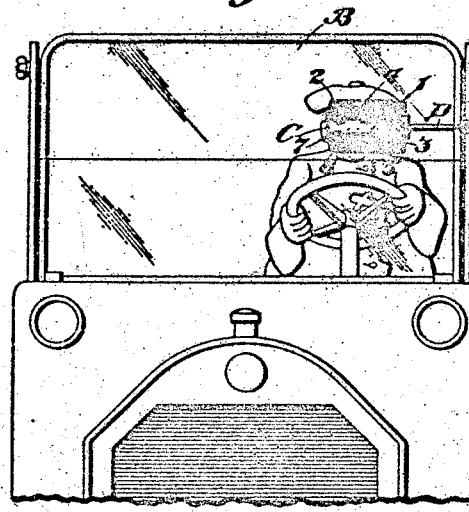
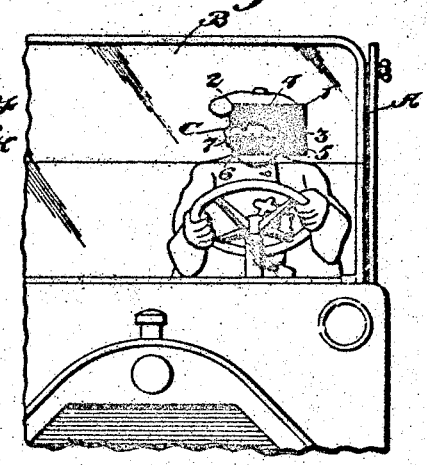
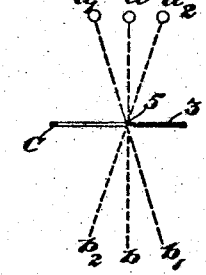
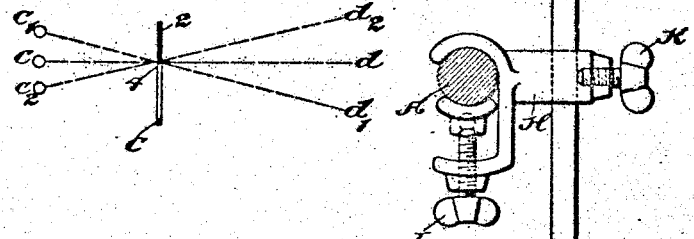
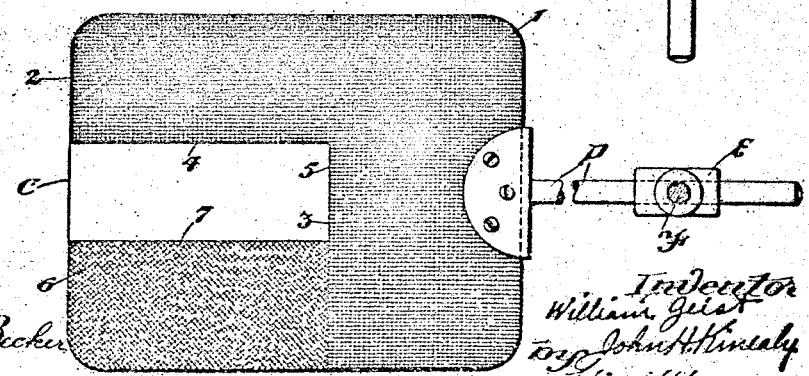
Attest.
Charles A. Becker
Inventor
William Geist
by John H. Kinealy
His Attorney

UNITED STATES PATENT OFFICE.

WILLIAM GEIST, OF UNIVERSITY CITY, MISSOURI.

GLARE-PROTECTOR.

1,258,107.  Specification of Letters Patent.  Patented Mar. 5, 1918.

Application filed October 20, 1916. Serial No. 126,747.

*To all whom it may concern:*

Be it known that I, WILLIAM GEIST, a citizen of the United States, residing at University City, in the county of St. Louis and the State of Missouri, have invented a new and useful Improvement in Glare-Protectors, of which the following is a full, clear, and exact specification, reference being had to the accompanying drawings, which form a part thereof.

My invention relates to devices for use on vehicles, especially automobiles, for protecting the driver thereof from the glare of lights carried by approaching automobiles, street cars, and other vehicles.

The object of my invention is to provide a device that will effectively protect the driver of automobiles and other vehicles from the glare of approaching lights and thus making the driving of automobiles and other vehicles on the public streets and highways safe, and at the same time allow automobiles and other vehicles to be provided with bright, brilliant lights.

My invention is fully shown in the accompanying drawings where similar characters are used to designate similar parts. Figure 1 shows a front view of an automobile equipped with one form of my glare protector; Fig. 2 shows a front view of an automobile equipped with another form of my glare protector; Fig. 3 is a detail view of the parts of the protector shown in Fig. 1; Fig. 4 is a sectional view along the line 4—4 of Fig. 3; Figs. 5 and 6 are diagrams illustrating certain phases of the operation of the glare protector.

Referring to the figures, A is a support by which the protector is carried and which in the specific embodiment shown in the drawings is the ordinary support used on automobiles for carrying the wind-shield. B is the upper glass of the ordinary form of wind-shield used on automobiles, and which is pivoted near its upper edge on the supports. C is the glare protector which in the form shown in Fig. 1 is fastened to the rod D which is adapted to slide in the head E fastened at the end of the rod F. G is a thumb-nut by means of which the rod D may be held in any desired position in the head E. The rod F slides in the member H which can be clamped in position on the support A by means of the thumb-nut I. K is a thumb-nut by means of which the rod F may be clamped in position in the member H. The protector C is a transparent body having an area 1 adapted to cut off the glare of an approaching light. This area 1 is preferably opaque and black, as shown. The area 1 is made with two arms: The first, the arm 2, is made to extend horizontally over the normal line of sight of the driver, as shown in Figs. 1 and 2, and its lower edge 4 is preferably a substantially horizontal line; the second arm 3 of the area 1 extends vertically to the left of the normal line of sight of the driver and its edge 5 is, preferably, a substantially vertical line extending downwardly from the lower edge 4 of the first arm 2. The protector may also have an area 6 which is semi-transparent and preferably of an amber color. This area 6 extends toward the right from the second arm 3 of the area 1, and its upper edge 7 is preferably a horizontal line. That space of the protector between the edges 4 and 7 to the right of the edge 5 is clear and transparent so that the driver of the automobile can see through it with ease. When speaking of right or left edges of the area 1, or parts of the protector, I mean those edges or parts which, when the protector is viewed by the driver of the automobile on which it is mounted, will be toward the right or left, as the case may be, of the driver of the automobile. When in use the protector is adjusted and clamped on the support A so that the lower edge 4 of the arm 2 of the area 1 will be slightly above the normal line of sight of the driver, as shown in Figs. 1 and 2, and by means of the rod F the protector is brought to a position between the wind-shield and the eyes of the driver that is most convenient for the driver; and by means of the rod D the protector is adjusted so that the right edge 5 of the second arm 3 of the area 1 is to the left of the normal line of sight of the driver, as shown in Figs. 1 and 2. In Fig. 2 the areas 1 and 6 are shown as formed on the upper part B of the wind-shield, so that this part B serves as a wind-shield and also as a protector. This arrangement, however, is not so good as that shown in Figs. 1, 3 and 4, because the protector is not adapted to be adjusted to the requirements of different drivers as it is in the case of the protector shown in Figs. 1, 3 and 4; and, further, when the protector and the upper part B of the shield are made in one piece the protector is thrown out of use when the upper part of the shield is raised, as is often desirable when driving in the summer time.

When the driver of an automobile, equipped with the protector, sees a light approaching him he turns his machine to the right side of the road and moves his head so that his line of sight is to the right of the edge 5 of the vertical arm 3, as shown in Fig. 5, by the line $a$—$b$. If the driver desires to see to the left of his machine he moves his head so that his line of sight is as shown by the line $a_1$—$b_1$ in Fig. 5. And as the light approaches, the driver moves his head to the left so that his line of sight occupies the position indicated by the line $a_2$—$b_2$; thus interposing the opaque arm 3 between him and the approaching light. When the approaching light is at a considerable distance in front of the driver he moves his head so that his line of sight is, as shown by the line $c$—$d$ in Fig. 6, just below the edge 4 of the horizontal arm 2 of the area 1. When the driver wishes to look forward and upward he moves his head downward until the line of sight is as shown by the line $c_2$—$d_2$ in Fig. 6. And when the driver wishes to cut off the glare of a light in front of his machine he raises his head so that the line of sight is as shown by the line $c_1$—$d_1$ in Fig. 6, and thus interposes the horizontal arm 2 of the area 1 between his eyes and the approaching light.

Sometimes it is desirable to look directly at the approaching light and then the driver lowers his head and looks through the semi-transparent area 6.

It is thus seen that by having the protector in proper adjustment to the normal line of sight of the driver the driver can, by moving his head, interpose the opaque area 1 between his eyes and the approaching light and thus protect himself from the glare thereof, while at the same time looking through the transparent part of the protector he can see the road in front of him to the right of the vertical edge 5 and below the horizontal edge 4.

I preferably form the protector of glass; and I preferably make the area 1 opaque and black, but it may be of any color so long as it will cut off the glare of an approaching light. I do not mean to limit myself either as to the material of which the protector is formed or as to the degree of opaqueness or color of the area 1.

What I claim as new and desire to secure by Letters Patent, is:

1. A glare protector for an automobile comprising a support, a body carried by said support and having an area adapted to cut off the glare of an approaching light, said area having a part extending from the left toward the right over the normal line of sight of the driver of said automobile and having a second part extending downwardly at the left of said normal line of sight.

2. A glare protector for an automobile comprising a support, a body carried by said support and having an area adapted to cut off the glare of an approaching light, said area having a part extending from the left toward the right over the normal line of sight of the driver of said automobile and having a second part extending downwardly at the left of said normal line of sight, and an area which is semi-transparent and which extends from left toward the right below said normal line of sight and separate from said first part of said first area.

In witness whereof I have signed my name to this specification.

WILLIAM GEIST.